(12) United States Patent
Sato et al.

(10) Patent No.: US 7,833,099 B2
(45) Date of Patent: Nov. 16, 2010

(54) GAME APPARATUS AND RECORDING MEDIUM RECORDING GAME PROGRAM FOR DISPLAYING A MOTION MATCHING A PLAYER'S INTENTION WHEN MOVING AN INPUT DEVICE

(75) Inventors: Kenta Sato, Kyoto (JP); Yoshikazu Yamashita, Kyoto (JP); Takayuki Shimamura, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1049 days.

(21) Appl. No.: 11/520,820

(22) Filed: Sep. 14, 2006

(65) Prior Publication Data

US 2007/0265084 A1 Nov. 15, 2007

(30) Foreign Application Priority Data

Apr. 28, 2006 (JP) .............................. 2006-126062

(51) Int. Cl.
*A63F 9/24* (2006.01)
(52) U.S. Cl. ......................................................... 463/37
(58) Field of Classification Search .................... 463/37
See application file for complete search history.

(56) References Cited

U.S. PATENT DOCUMENTS 7,424,388 B2 * 9/2008 Sato ............................ 702/152

FOREIGN PATENT DOCUMENTS

JP 2000-308756 11/2000

* cited by examiner

*Primary Examiner*—Corbett B Couburn
(74) *Attorney, Agent, or Firm*—Nixon & Vanderhye P.C.

(57) ABSTRACT

Operation information which is output, depending on a motion of an input device is successively obtained, and based on the operation information, a direction and movement velocity of the input device is determined. Next, it is determined whether or not the movement velocity is larger than or equal to a first threshold value. When the movement velocity is larger than or equal to the first threshold value, a path along which an object is moved in a virtual world is determined based on predetermined information about the movement path. When the movement velocity is smaller than the first threshold value, a path in which the object is moved in the virtual world is determined based on the determined movement velocity. Based on the determined movement path, it is displayed how the object is moved through positions in the virtual world.

36 Claims, 11 Drawing Sheets

GAME APPARATUS AND RECORDING MEDIUM RECORDING GAME PROGRAM FOR DISPLAYING A MOTION MATCHING A PLAYER'S INTENTION WHEN MOVING AN INPUT DEVICE

CROSS REFERENCE TO RELATED APPLICATION

The disclosure of Japanese Patent Application No. 2006-126062, filed on Apr. 28, 2006, is incorporated herein by reference.

BACKGROUND

1. Field

Example embodiments of the present invention relate to a game apparatus and a recording medium recording a game program. More particularly, example embodiments of the present invention relate to a game apparatus for performing a game process, depending on a motion of an input device itself, and a recording medium recording a game program.

2. Description of the Background Art

Conventionally, there are games in which a stick-like object, such as a golf club, a baseball bat, or the like, is swung (e.g., a golf game, a baseball game, etc.). In these games, a button or a lever which utilizes a switch is used as a controller for inputting a motion of swinging the stick-like object. Apart from this, a controller (input control device) in the shape of a stick has been disclosed (e.g., Japanese Patent Laid-Open Publication No. 2000-308756). A controller disclosed in Japanese Patent Laid-Open Publication No. 2000-308756 comprises an acceleration sensor. A player holds the stick-like controller and actually performs a swing motion. For example, in a 3D game which provides a sense of swordplay, a stick-like controller is assumed to be a sword, and a player moves a controller as if the player swung a sword. In this case, movement data of the sword in a game space is determined based on data output from the acceleration sensor, and a motion of a player object swinging the sword in accordance with a player's motion is displayed as a game image.

However, the input control device disclosed in Japanese Patent Laid-Open Publication No. 2000-308756 has the following problems. For example, when the stick-like controller is quickly swung, the quickness of the motion exceeds the detection speed of the acceleration sensor, so that movement data of a motion which is different from an actual player's operation may be obtained. Therefore, a motion intended by the player is not expressed, so that a motion which is significantly different from a player's motion may be expressed, or a motion on which a player's motion is not reflected at all is expressed, thereby making a game less exciting.

SUMMARY

Therefore, an aspect of example embodiments of the present invention is to a game apparatus which employs an input device capable of detecting a velocity of an acceleration sensor or the like, and can display a motion which matches a player's intention even when the input device is quickly moved, and a game program.

Example embodiments of the present invention have for example the following features to attain the aspect mentioned above. Note that reference numerals, additional descriptions and the like inside parentheses in this section indicate correspondence to embodiments described below for the sake of easy understanding, and do not limit the present invention.

A first aspect of example embodiments of the present invention is directed to a game apparatus for performing a game process, depending on a motion of an input device itself, comprising an output data obtaining means (6, 36), a movement coordinate determining means (30), an object moving means (30), and a display control means (30, 37). The output data obtaining means obtains first output data and second output data which change, depending on the motion of the input device itself. The movement coordinate determining means determines whether or not the first output data is larger than or equal to a first threshold value, and when the first output data is larger than or equal to the first threshold value, determines a coordinate point to which an object is next moved in a predetermined change amount along a predetermined path in a virtual game space, and when the first output data is smaller than the first threshold value, determines a coordinate point to which the object is next moved along the predetermined path in the virtual game space, using the first output data and the second output data; an object moving means for moving the object to the determined movement coordinate point in the virtual game space. The display control means displays the virtual game space on a display device, depending on a result of the object moving means. Here, the first output data is, for example, data about a motion of the input device itself in a Z-axis direction, and the second output data is, for example, data about a motion of the input device itself in an X-axis direction.

In a second aspect based on the first aspect, when the first output data is smaller than the first threshold value, the movement coordinate determining means determines a coordinate point to which the object is moved in a direction along the predetermined path in the virtual game space corresponding to a direction in which the input device itself is moved based on the second output data.

In a third aspect based on the first aspect, the game apparatus further comprises a tilt calculating means (30) for calculating a tilt of the input device itself using the first output data and the second output data. When the first output data is smaller than the first threshold value, the movement coordinate determining means determines a coordinate point to which the object is moved in a direction along the predetermined path in the virtual game space based on the tilt calculated by the tilt calculating means.

In a fourth aspect based on the first aspect, in the case where the first output data is larger than or equal to the first threshold value, when the second output data is larger than or equal to the second threshold value, the movement coordinate determining means determines a coordinate point to which the object is next moved in the predetermined change amount along the predetermined path in the virtual game space, and when the second output data is smaller than the second threshold value, the movement coordinate determining means determines a coordinate point to which the object is next moved along predetermined path in the virtual game space using the first output data and the second output data.

In a fifth aspect based on the first aspect, the game apparatus further comprises an output data accumulating means (30) for accumulating a value of the second output data per unit time. The movement coordinate determining means determines per the unit time whether or not the accumulated value of the second output data is larger than or equal to a third threshold value, and when the accumulated value of the second output data is larger than or equal to the third threshold value, determines a coordinate point to which the object is next moved in the predetermined change amount along the predetermined path in the virtual game space, and when the accumulated value of the second output data is smaller than the third threshold value, the movement coordinate determining means determines a coordinate point to which the object is next moved along predetermined path in the virtual game space using the first output data and the second output data.

In a sixth aspect based on the fifth aspect, the output data accumulating means starts accumulating the value of the second output data only when a value of the first output data continues to be larger than or equal to the first threshold value for a predetermined time or more.

In a seventh aspect based on the sixth aspect, the game apparatus further comprises an accumulated value initializing means (30) for initializing the accumulated value of the second output data when the first output data becomes smaller than or equal to the first threshold value after the output data accumulating means starts accumulating the value of the second output data.

In an eighth aspect based on the fifth aspect, the game apparatus further comprises a dominant arm information storing means for setting and storing dominant arm information which is information about a player's dominant arm, into a memory. The output data accumulating means starts accumulating the value of the second output data separately in directions of the input device itself, depending on the dominant arm information.

In a ninth aspect based on the first aspect, the movement coordinate determining means determines a coordinate point to which the object is next moved along predetermined path in the virtual game space no matter whether or not the first output data is larger or equal to the first threshold value, until a predetermined time passes after the coordinate point to which the object is next moved along predetermined path in the virtual game space is determined.

In a tenth aspect based on the first aspect, the input device comprises an acceleration sensor for detecting an acceleration occurring in the input device. The first output data and the second output data are acceleration data which is output from the acceleration sensor, depending on the motion of the input device itself.

In an eleventh aspect based on the first aspect, the game process is a process of executing a game in which a player character swings an item possessed by the player character to hit a ball to cause the ball to fly in a virtual game world. The object is an item object possessed by the player character. The predetermined path is a path for displaying a series of motions of the player character swinging the item.

A twelfth aspect of example embodiments of the present invention is directed to a recording medium recording a game program which is executed by a computer of a game apparatus for performing a game process, depending on a motion of an input device itself, the game program causing the computer to execute an output data obtaining step (S11), a movement coordinate determining step (S2), an object moving step (S32, S36), and a display control step (S32, S36). The output data obtaining step obtains first output data and second output data which change, depending on the motion of the input device itself The movement coordinate determining step determines whether or not the first output data is larger than or equal to a first threshold value, and when the first output data is larger than or equal to the first threshold value, determines a coordinate point to which an object is next moved in a predetermined change amount along a predetermined path in a virtual game space, and when the first output data is smaller than the first threshold value, determines a coordinate point to which the object is next moved along the predetermined path in the virtual game space, using the first output data and the second output data. The object moving step moves the object to the determined movement coordinate point in the virtual game space. The display control step displays the virtual game space on a display device, depending on a result of the object moving step.

In a thirteenth aspect based on the twelfth aspect, when the first output data is smaller than the first threshold value, the movement coordinate determining step determines a coordinate point to which the object is moved in a direction along the predetermined path in the virtual game space corresponding to a direction in which the input device itself is moved based on the second output data.

In a fourteenth aspect based on the twelfth aspect, the game program causes the computer to further execute a tilt calculating step (S35) of calculating a tilt of the input device itself using the first output data and the second output data. When the first output data is smaller than the first threshold value, the movement coordinate determining step determines a coordinate point to which the object is moved in a direction along the predetermined path in the virtual game space based on the tilt calculated by the tilt calculating step.

In a fifteenth aspect based on the twelfth aspect, in the case where the first output data is larger than or equal to the first threshold value, when the second output data is larger than or equal to the second threshold value, the movement coordinate determining step determines a coordinate point to which the object is next moved in the predetermined change amount along the predetermined path in the virtual game space, and when the second output data is smaller than the second threshold value, the movement coordinate determining step determines a coordinate point to which the object is next moved along predetermined path in the virtual game space using the first output data and the second output data.

In a sixteenth aspect based on the twelfth aspect, the game program causes the computer to further execute an output data accumulating step of accumulating a value of the second output data per unit time. The movement coordinate determining step determines per the unit time whether or not the accumulated value of the second output data is larger than or equal to a third threshold value, and when the accumulated value of the second output data is larger than or equal to the third threshold value, determines a coordinate point to which the object is next moved in the predetermined change amount along the predetermined path in the virtual game space, and when the accumulated value of the second output data is smaller than the third threshold value, the movement coordinate determining step determines a coordinate point to which the object is next moved along predetermined path in the virtual game space using the first output data and the second output data.

In a seventeenth aspect based on the sixteenth aspect, the output data accumulating step starts accumulating the value of the second output data only when a value of the first output data continues to be larger than or equal to the first threshold value for a predetermined time or more.

In an eighteenth aspect based on the seventeenth aspect, the game program causes the computer to further execute an accumulated value initializing step (S27) of initializing the accumulated value of the second output data when the first output data becomes smaller than or equal to the first threshold value after the output data accumulating step starts accumulating the value of the second output data.

In a nineteenth aspect based on the sixteenth aspect, the game program causes the computer to further execute a dominant arm information storing step of setting and storing dominant arm information which is information about a player's dominant arm, into a memory. The output data accumulating step starts accumulating the value of the second output data separately in directions of the input device itself, depending on the dominant arm information.

In a twentieth aspect based on the twelfth aspect, the movement coordinate determining step determines a coordinate point to which the object is next moved along predetermined path in the virtual game space no matter whether or not the first output data is larger or equal to the first threshold value, until a predetermined time passes after the coordinate point to which the object is next moved along predetermined path in the virtual game space is determined.

In a twenty-first aspect based on the twelfth aspect, the input device comprises an acceleration sensor for detecting an acceleration occurring in the input device. The first output data and the second output data are acceleration data which is output from the acceleration sensor, depending on the motion of the input device itself.

In a twenty-second aspect based on the twelfth aspect, the game process is a process of executing a game in which a player character swings an item possessed by the player character to hit a ball to cause the ball to fly in a virtual game world. The object is an item object possessed by the player character. The predetermined path is a path for displaying a series of motions of the player character swinging the item.

According to the first aspect, when a movement speed of the input device is excessively high, so that a motion of a player's arm cannot be accurately reflected, a previously prepared animation of a motion which would be performed by a player is displayed. When the movement speed is not so high, a motion on which a motion of a player's arm is reflected is successively displayed. Thereby, it is possible to prevent a motion which is not intended by a player from being displayed due to an excessively high speed of a player's arm, or the like.

According to the second aspect, an object is moved, depending on a direction in which the input device itself is moved, so that a player feels a larger sense of togetherness with a game, and is likely to feel empathy, thereby causing the game to be more exciting.

According to the third aspect, further, an object can be moved, depending on a tilt of the input device, thereby making it possible to enhance the reality of movement of the object in a game space, so that a player can feel stronger empathy with respect to the game. As a result, the game becomes more exciting.

According to the fourth aspect, for example, a movement coordinate point of the input device is determined using a direction axis (e.g., a Z-axis direction) which is different from a direction axis (e.g., X-axis direction) used for tilt determination. Therefore, a motion of the input device (i.e., a motion of a player swinging an arm) can be more accurately detected, thereby making it possible to more appropriately prevent a motion which is not intended by the player from being displayed.

According to the fifth aspect, output data is accumulated before determination, thereby making it possible to reduce unrealistic sensation which a player feels due to a sensitive reaction.

According to the sixth aspect, accumulation of the second output data is started when the value of the first output data is held at some level, thereby making it possible to reduce unrealistic sensation which a player feels due to a sensitive reaction.

According to the seventh aspect, an accumulated value is initialized, whereby a motion of a player moving the input device can be more accurately reflected, for example, when the player suddenly stops swinging an arm.

According to the eighth aspect, a movement velocity is sensed with respect a direction corresponding to a player's dominant arm. Therefore, it is possible to provide a game supporting both right-handed and left-handed players, thereby making it possible to cause the player to feel empathy. As a result, the game can be caused to be more exciting.

According to the ninth aspect, once a motion is started to be moved along a determined path, the motion is successively displayed for a predetermined time. Thereby, it is possible to prevent a motion which is not intended by a player from being displayed due to an erroneous operation or the like after the motion is once started to be moved along the determined path.

According to the tenth aspect, it is possible to determine a movement velocity using an acceleration sensor. Therefore, it is possible to determine more accurately a movement velocity.

According to the eleventh aspect, it is possible to prevent a motion which is not intended by a player from being performed due to an excessively high movement velocity of the input device. Therefore, in the case of games in which a motion to be performed is restricted to some extent, such as a swinging motion of a golf club in a golf game, a swinging motion of a bat in a baseball game, and the like, the game can be effectively caused to be more exciting.

According to the recording medium recording the game program of example embodiments of the present invention, effects similar to the above-described effects of the game apparatus of example embodiments of the present invention can be obtained.

These and other features, aspects and advantages of the example embodiments of the present invention will become more apparent from the following detailed description of example embodiments of the present invention when taken in conjunction with the accompanying drawings.

DESCRIPTION OF THE NON-LIMITING EXAMPLE EMBODIMENTS

Hereinafter, example embodiments of the present invention will be described with reference to the accompanying drawings. Note that the present invention is not limited by the examples.

Figure 1:
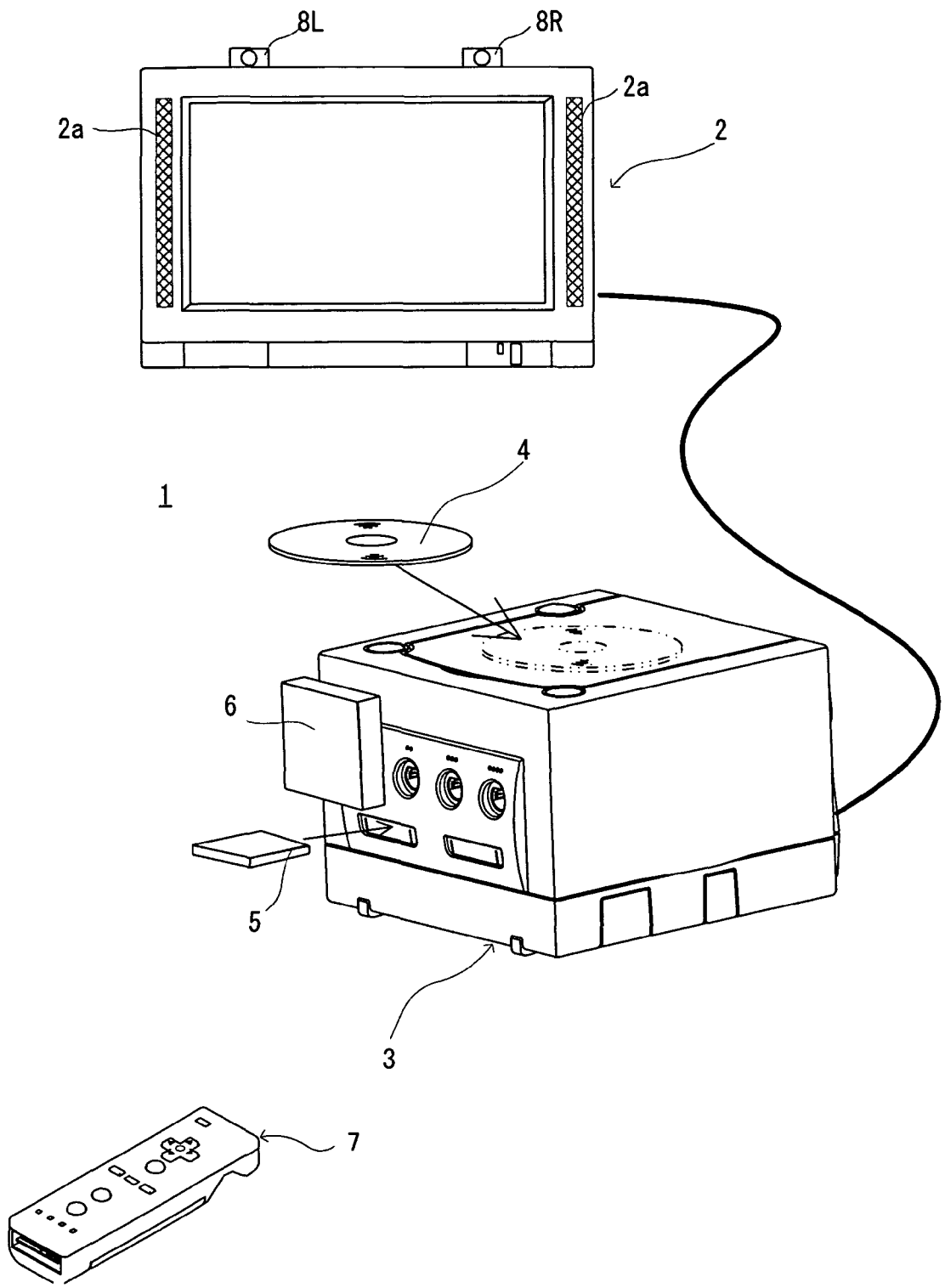
FIG. 1 is a diagram illustrating an external appearance of a game system 1 according to an example embodiment of the present invention.

A game apparatus according to an example embodiment of the present invention will be described with reference to FIG. 1. A game system 1 employing the game apparatus will be described as an example so as to specifically describe the example embodiment of the present invention. Note that FIG. 1 is an external appearance diagram for describing the game system 1. Hereinafter, the game system 1 will be described, illustrating a stationary game apparatus as an example.

In FIG. 1, the game system 1 is composed of a stationary game apparatus (hereinafter simply referred to as a game apparatus) 3 which is connected via a connection code to a display (hereinafter referred to as a monitor) 2 with a loudspeaker 2a, such as a television set for home use or the like, and a controller 7 which inputs operation information to the game apparatus 3. The game apparatus 3 is connected via a connection terminal to a reception unit 6. The reception unit 6 receives transmission data wirelessly transmitted from the controller 7, so that the controller 7 and the game apparatus 3 are connected together via wireless communication. An optical disc 4 which is an exemplary information storing medium changeable with respect to the game apparatus 3, is detachably attached to the game apparatus 3. On an upper major surface of the game apparatus 3, a power ON/OFF switch for the game apparatus 3, a reset switch for a game process, and an OPEN switch for opening an upper lid of the game apparatus 3, are provided. Here, the lid is opened by a player pushing down the OPEN switch, so that the optical disc 4 can be attached or detached.

An external memory card 5 carrying, for example, a backup memory fixedly storing saved data or the like, is detachably attached to the game apparatus 3 as required. The game apparatus 3 executes a game program or the like stored on the optical disc 4, and displays a result of the execution as a game image on the monitor 2. The game apparatus 3 can also reproduce a game state which was executed in the past, using the saved data stored in the external memory card 5, and display a resultant game image on the monitor 2. The player of the game apparatus 3 can enjoy events of the game by operating the controller 7 while watching a game image displayed on the monitor 2.

The controller 7 wirelessly transmits transmission data from a communication section 75 (described below) included therein to the game apparatus 3 to which the reception unit 6 is connected, using, for example, the Bluetooth® technique. The controller 7 is an operation means for mainly performing an operation for operating a player object appearing in a game space displayed on the monitor 2. The controller 7 is provided with an operation section composed of a plurality of operation buttons, keys and sticks, and the like. The controller 7 also comprises an image capture information computing section 74 for capturing an image viewed from the controller 7 as specifically described below. As exemplary objects whose images to be captured by the image capture information computing section 74, two LED modules (hereinafter referred to as markers) 8L and 8R are provided in the vicinity of a display screen of the monitor 2. The markers 8L and 8R each emit infrared light toward the front of the monitor 2. Note that, in this example, since information about an image captured by the image capture information computing section 74 is not used, the markers 8L and 8R do not need to be provided.

Next, a configuration of the game apparatus 3 will be described with reference to FIG. 2. Note that FIG. 2 is a functional block diagram of the game apparatus 3.

Figure 2:
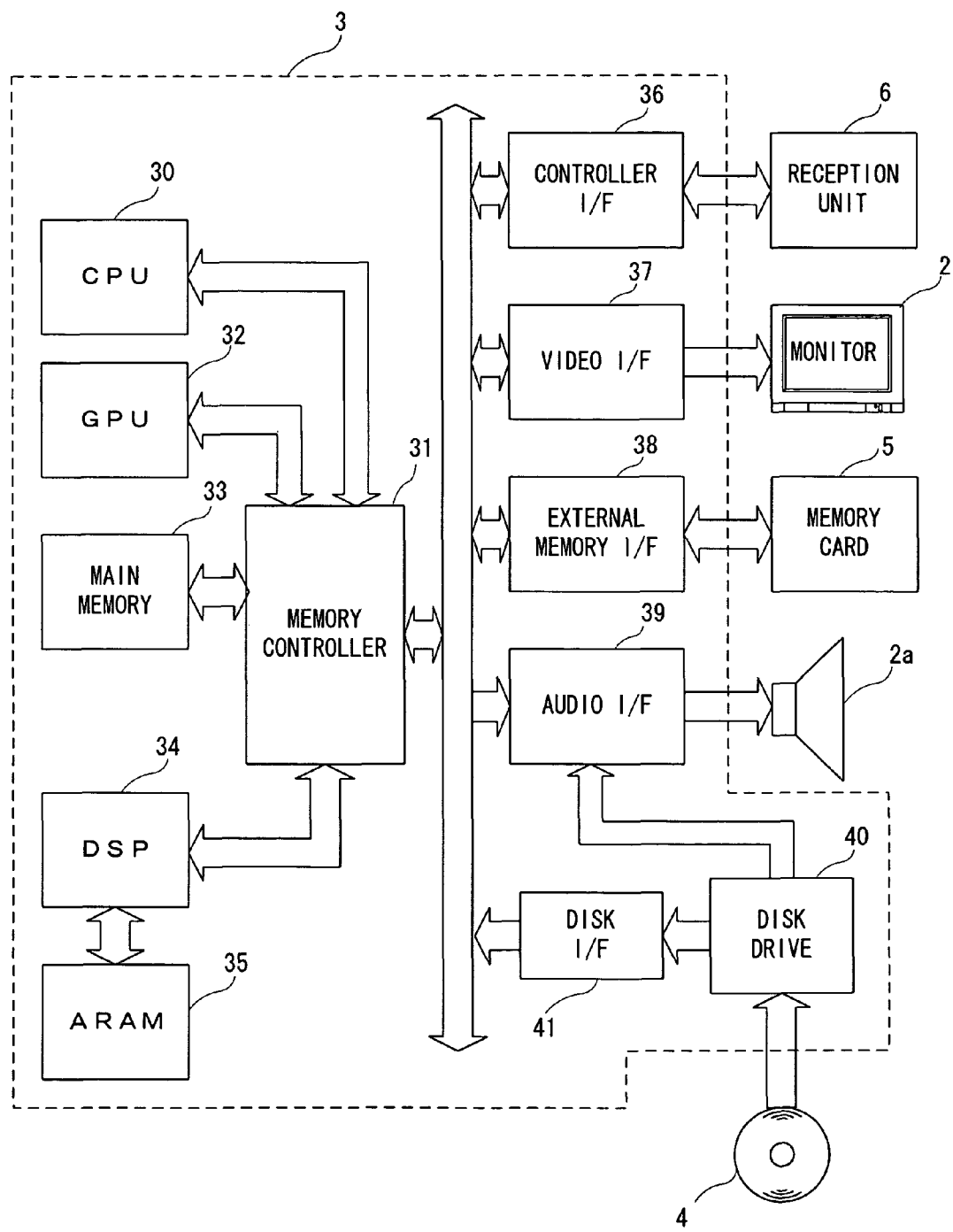
FIG. 2 is a functional block diagram of a game apparatus 3 of FIG. 1.

In FIG. 2, the game apparatus 3 comprises, for example, a RISC CPU (central processing unit) 30 which executes various programs. The CPU 30 executes a boot program stored in a boot ROM (not shown) and performs, for example, initialization of memories, such as a main memory 33 and the like, before executing a game program stored in the optical disc 4, and performing, for example, a game process corresponding to the game program. A GPU (Graphics Processing Unit) 32, the main memory 33, a DSP (Digital Signal Processor) 34, and an ARAM (Audio RAM) 35 are connected via a memory controller 31 to the CPU 30. A controller I/F (interface) 36, a video I/F 37, an external memory I/F 38, an audio I/F 39, and a disc I/F 31 are connected via a predetermined bus to the memory controller 31. The reception unit 6, the monitor 2, the external memory card 5, a loudspeaker 2a, and a disc drive 40 are connected to the controller I/F 36, the video I/F 37, the external memory I/F 38, the audio I/F 39, and the disc I/F 41, respectively.

The GPU 32 performs image processing based on an instruction from the CPU 30, and is composed of, for example, a semiconductor chip which performs a calculation process required for 3D graphics display. The GPU 32 performs image processing using a memory specialized for image processing or a memory area which is a portion of the main memory 33. The GPU 32 uses these to generate object image data, game image data or movie video to be displayed on the monitor 2, and outputs the data via the memory controller 31 and the video I/F 37 to the monitor 2 as appropriate.

The main memory 33 is a memory area used in the CPU 30, and stores a game program or the like required for a process by the CPU 30 as appropriate. For example, the main memory 33 stores a game program, various data, or the like read from the optical disc 4 by the CPU 30. The game program, the various data, or the like stored in the main memory 33 are executed by the CPU 30.

The DSP 34 processes sound data or the like which is generated in the CPU 30 when a game program is executed. The ARAM 35 for storing the sound data or the like is connected to the DSP 34. The ARAM 35 is used when the DSP 34 performs a predetermined process (e.g., storage of a read-ahead game program or sound data). The DSP 34 reads sound data stored in the ARAM 35, and outputs the data via the memory controller 31 and the audio I/F 39 to the loudspeaker 2a included in the monitor 2.

The memory controller 31 performs a centralized control of data transfer. The above-described various I/Fs are connected to the memory controller 31. The controller I/F 36 is composed of, for example, four controller I/Fs 36a to 36d, and communicably connects an external apparatus which can be engaged with the four controller I/Fs 36a to 36d via connectors thereof, and the game apparatus 3. For example, the reception unit 6 is engaged with the connector to be connected via the controller I/F 36 to the game apparatus 3. As described above, the reception unit 6 receives transmission data from the controller 7, and outputs the transmission data via the controller I/F 36 to the CPU 30. The monitor 2 is connected to the video I/F 37. The external memory card 5 is connected to the external memory I/F 38, thereby making it possible to access a backup memory or the like provided in the external memory card 5. The loudspeaker 2a included in the monitor 2 is connected to the audio I/F 39 so that sound data read from the ARAM 35 by the DSP 34 or sound data directly output from the disc drive 40 can be output from the loudspeaker 2a. The disc drive 40 is connected to the disc I/F 41. The disc drive 40 reads data stored at a predetermined read-out position on the optical disc 4, and outputs the data to the bus and the audio I/F 39 of the game apparatus 3.

Figure 3:
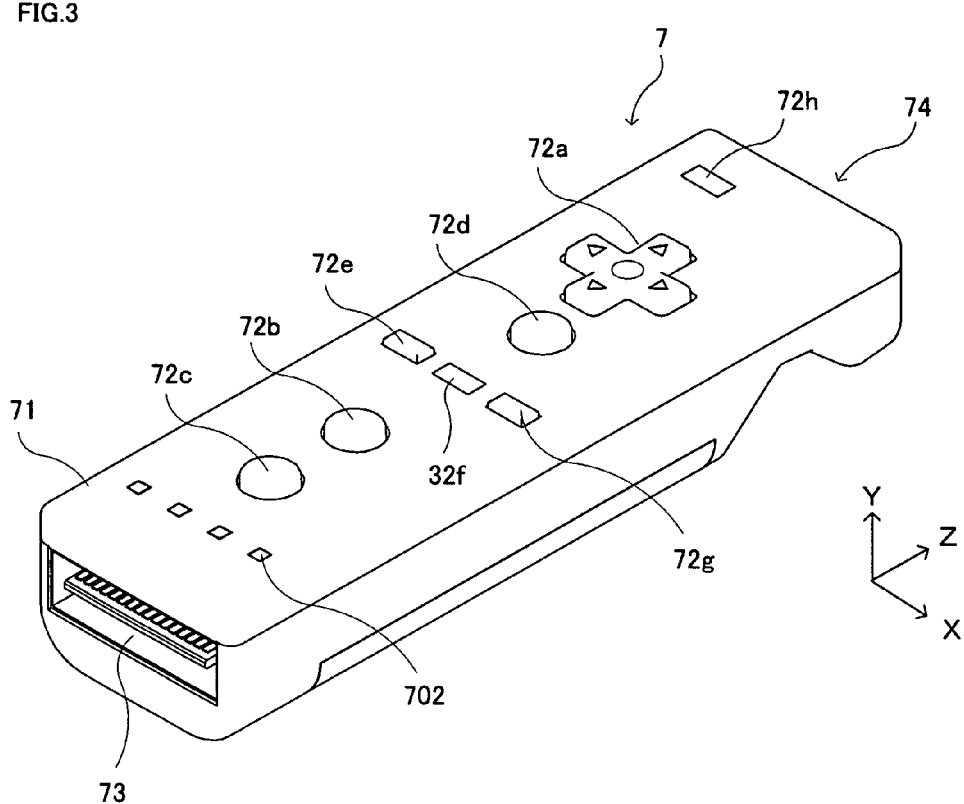
FIG. 3 is a perspective view of a controller 7 of FIG. 1 as viewed from the top and the rear.
Figure 4:
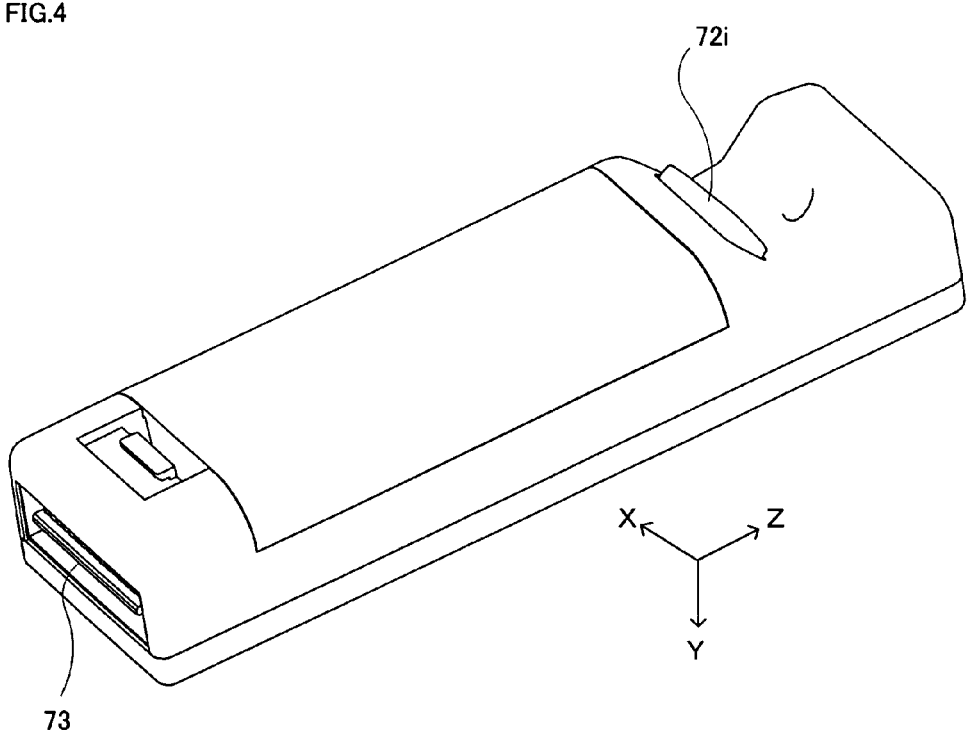
FIG. 4 is a perspective view of the controller 7 of FIG. 1 as viewed from the bottom and the rear.

The controller 7 which is an exemplary input device of example embodiments of the present invention will be described with reference to FIGS. 3 and 4. Note that FIG. 3 is a perspective view of the controller 7 as viewed from the top and the rear. FIG. 4 is a perspective view of the controller 7 as viewed from the bottom and the rear.

In FIGS. 3 and 4, the controller 7 has a housing 71 formed by, for example, plastic molding. The housing 71 is provided with a plurality of operation sections 72. The housing 71 is in the shape of substantially a rectangular parallelepiped where a front-to-rear direction is a longitudinal direction. The whole housing 71 has a size which allows an adult and a child to hold the controller 7 with one hand.

A cross key 72a is provided on a central portion closer to a front side of an upper surface of the housing 71. The cross key 72a is a four-direction push switch in the shape of a cross, and has operation portions corresponding to the respective four directions (front, rear, left, and right) indicated by arrows, the operation portions being provided at the respective projecting pieces of the cross which are arranged at intervals of 90°. Any of the front, rear, left and right directions is selected by a player pushing down any of the operation portions of the cross key 72a. For example, by a player operating the cross key 72a, a movement direction of a player character or the like appearing in a virtual game world can be designated, or a movement direction of a cursor can be designated.

Note that the cross key 72a is an operation section which outputs an operation signal, depending on the above-described direction input operation of a player, or may be an operation section of other embodiments. For example, a complex switch composed of a push switch having four direction operation portions arranged in a ring shape, and a center switch provided at a center thereof, may be provided instead of the cross key 72a. Also, instead of the cross key 72a, an operation section may be provided which outputs an operation signal, depending on a tilt direction of a tiltable stick which projects from the upper surface of the housing 71. Also, instead of the cross key 72a, an operation section may be provided which outputs an operation signal, depending on a slide direction of an disc-like member which can be moved in a horizontal direction. Also, a touch pad may be provided instead of the cross key 72a. Also, instead of the cross key 72a, an operation section may be provided which outputs an operation signal, depending on which is pushed down among switches indicating at least four directions (front, rear, left, and right).

A plurality of operation buttons 72b to 72g are provided at the rear of the cross key 72a on the upper surface of the housing 71. The operation buttons 72b to 72g are operation sections which output operation signals assigned to the respective operation buttons 72b to 72g when a player pushes down the head portions of the respective buttons. For example, functions of an X button, a Y button, a B button, and the like are assigned to the operation buttons 72b to 72d. Functions of a select switch, a menu switch, a start switch, and the like are assigned to the operation buttons 72e to 72g. Although the operation buttons 72b to 72g are assigned the respective functions, depending on a game program executed by the game apparatus 3, those are not directly involved with the description of the present invention and will not be described in detail. Note that, in the exemplary arrangement of FIG. 3, the operation buttons 72b to 72d are aligned on a central portion in a front-to-rear direction of the upper surface of the housing 71. The operation buttons 72e to 72g are aligned in a lateral direction on the upper surface of the housing 71 and between the operation buttons 72b and 72d. The operation button 72f is a button of a type whose upper surface is buried below the upper surface of the housing 71 so that a player is prevented from unintentionally and erroneously pushing down the button.

An operation button 72h is provided at the front of the cross key 72a on the upper surface of the housing 71. The operation button 72h is a power supply switch which remotely switches ON/OFF a power supply for the main body of the game apparatus 3. The operation button 72h is also a button of a type whose upper surface is buried below the upper surface of the housing 71 so that a player is prevented from unintentionally and erroneously pushing down the button.

A plurality of LEDs 702 are provided at the rear of the operation button 72c of the upper surface of the housing 71. Here, the controller 7 is assigned controller identification (number) so as to distinguish it from other controllers 7. For example, the LEDs 702 are used so as to inform the player of controller identification currently set for the controller 7. Specifically, when transmission data is transmitted from the controller 7 to the reception unit 6, one of the plurality of LEDs 702 is turned ON, depending on the controller identification.

On the other hand, a hollow portion is formed on a lower surface of the housing 71. The hollow portion on the lower surface of the housing 71 is formed at a position where the index finger or the middle finger of a player is placed when the player holds the controller 7, as specifically described below. An operation button 72i is provided on a rear slope surface of the hollow portion. The operation button 72i is an operation section which functions as, for example, an A button, and which is used as a trigger switch for a shooting game, or for an operation of causing a player object to be noticeable with respect to a predetermined object, or the like.

An image capturing element 743 which is a part of the image capture information computing section 74 is provided on a front surface of the housing 71. Here, the image capture information computing section 74 is a system for analyzing image data captured by the controller 7 to determine a place having a high luminance in the image data and detecting a center-of-gravity position or a size of the place. The image capture information computing section 74 has, for example, a maximum sampling cycle of about 200 frames/sec, and therefore, can track and analyze relatively high-speed movement of the controller 7. A connector 73 is provided on a rear surface of the housing 71. The connector 33 is, for example, a 32-pin edge connector which is utilized so as to be engaged and connected with a connection cable. Note that example embodiments of the present invention can be implemented without use of information from the image capture information computing section 74, and therefore, the image capture information computing section 74 will not be further described.

Here, to specifically describe example embodiments of the present invention, a coordinate system which is provided with respect to the controller 7 is defined. As illustrated in FIGS. 3 and 4, X, Y and Z axes, which are orthogonal to each other, are defined with respect to the controller 7. Specifically, a front-to-rear direction of the controller 7 (a longitudinal direction of the housing 71) is assumed to be the Z axis, and a front (a surface on which the image capture information computing section 74 is provided) direction of the controller 7 is assumed to be the positive direction of the Z axis. A vertical direction of the controller 7 is assumed to be the Y axis, and an upper surface (a surface on which the cross key 72a and the like are provided) direction of the housing 71 is assumed to be the positive direction of the Y axis. A lateral direction of the controller 7 is assumed to be the X axis, and a left side surface (a side surface illustrated in FIG. 4, but not in FIG. 3) direction of the housing 71 is assumed to be the positive direction of the X axis.

Figure 5A:
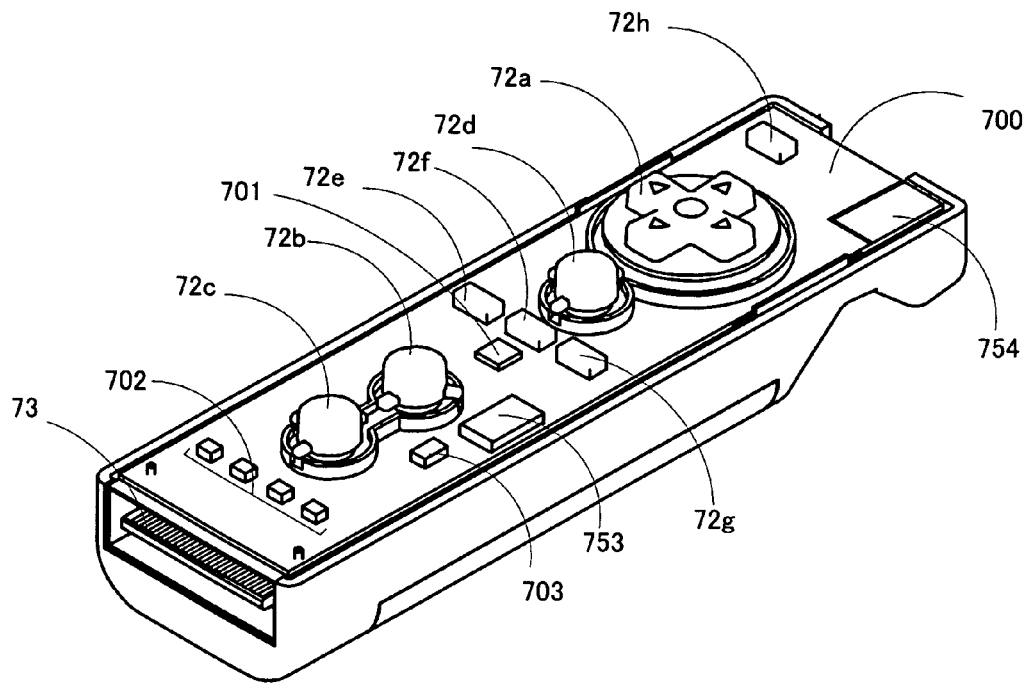
FIGS. 5A and 5B are perspective views of the controller 7 where a portion of a housing is cut away.
Figure 5B:
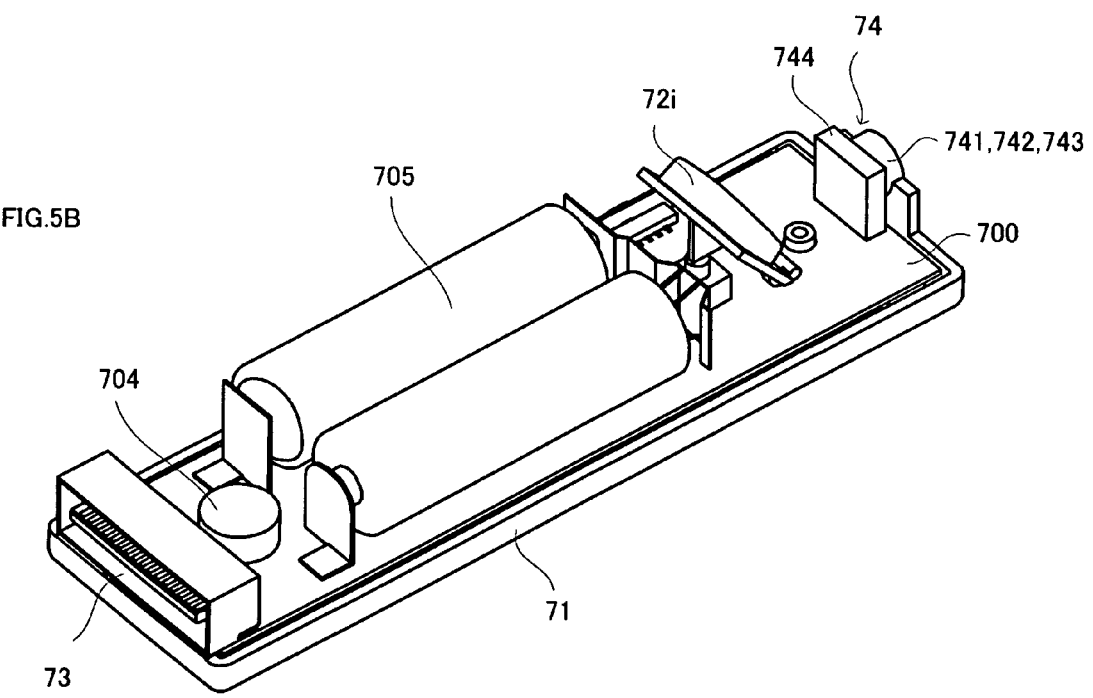

Next, an internal structure of the controller 7 will be described with reference to FIGS. 5A and 5B. Note that FIG. 5A is a perspective view of the controller 7 where an upper housing (a portion of the housing 71) is cut away. FIG. 5B is a perspective view of the controller 7 where a lower housing (a portion of the housing 71) is cut away. FIG. 5B illustrates a perspective view of a base board 700 of FIG. 5A as viewed from a bottom surface thereof.

In FIG. 5A, the base board 700 is fixed inside the housing 71. On an upper major surface of the base board 700, the operation buttons 72a to 72h, an acceleration sensor 701, the LEDs 702, a quartz oscillator 703, a radio module 753, an antenna 754, and the like are provided. These are connected to a microcomputer 751 (see FIG. 6) via a conductor (not shown) formed on the base board 700 and the like. The acceleration sensor 701 detects and outputs an acceleration, which can be used to calculate a tilt, a vibration, or the like in a three-dimensional space in which the controller 7 is placed.

Figure 6:
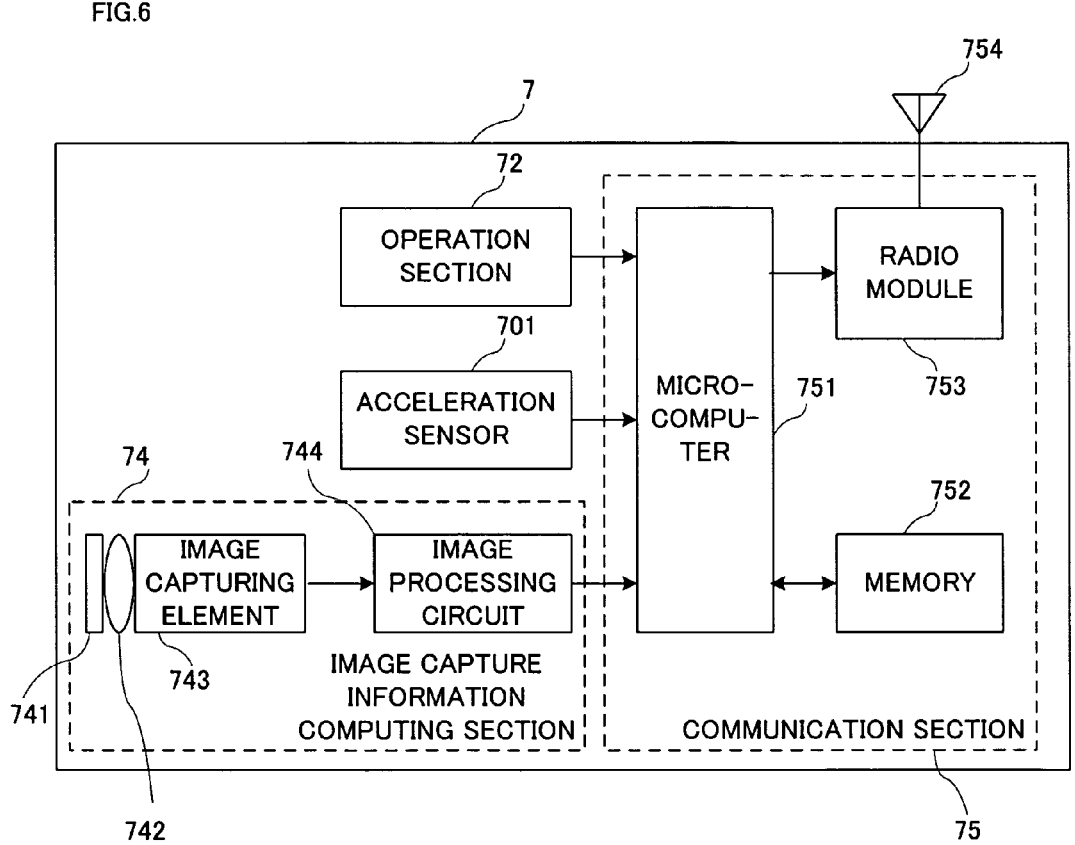
FIG. 6 is a block diagram illustrating a configuration of the controller 7.

More specifically, as illustrated in FIG. 6, the controller 7 preferably comprises a three-axis acceleration sensor 701. The three-axis acceleration sensor 701 detects linear accelerations in three directions, i.e., the vertical direction (the Y axis of FIG. 3), the lateral direction (the X axis of FIG. 3), and the front-to-rear direction (the Z axis of FIG. 3). In other embodiments, a two-axis acceleration detecting means for detecting only a linear acceleration in each of the X axis and the Y axis (or other pairs of axes), may be employed, depending on the type of a control signal used in a game process. For example, the three-or two-axis acceleration sensor 701 may be of a type which is available from Analog Devices, Inc. or STMicroelectronics N.V. The acceleration sensor 701 is preferably of a capacitance type (capacitance coupling type) based on a technique of MEMS (Micro Electro Mechanical Systems) obtained by micromachining silicon. However, the three-or two-axis acceleration sensor 701 may be provided using a technique of existing acceleration detecting means (e.g., a piezoelectric type or a piezoelectric resistance type) or other appropriate techniques which will be developed in the future.

As is known to those skilled in the art, an acceleration detecting means used as the acceleration sensor 701 can detect only an acceleration (linear acceleration) along a straight line corresponding to each axis of an acceleration sensor. In other words, a direct output from the acceleration sensor 701 is a signal indicating a linear acceleration (static or dynamic) along each of the two or three axes. Therefore, the acceleration sensor 701 cannot directly detect physical properties, such as a motion along a non-linear path (e.g., an arc, etc.), a rotation, a rotational motion, an angular displacement, a tilt, a position, an attitude, and the like.

However, it would be easily understood by those skilled in the art from the description of the present specification that further information about the controller 7 can be estimated or calculated (determined) by performing an additional process with respect to an acceleration signal output from the acceleration sensor 701. For example, when a static acceleration (gravity acceleration) is sensed, an output from the acceleration sensor 701 is used to perform a computation using a tilt angle and the detected acceleration, thereby making it possible to determine a tilt of a subject (the controller 7) with respect to a gravity vector. Thus, by using the acceleration sensor 701 in combination with the microcomputer 751 (or other processors), the tilt, attitude or position of the controller 7 can be determined. Similarly, for example, when the controller 7 comprising the acceleration sensor 701 is dynamically accelerated and moved by a user's hand as described below, various motions and/or positions of the controller 7 can be calculated by processing an acceleration signal generated by the acceleration sensor 701. In other examples, the acceleration sensor 701 may comprise an incorporation-type signal processing device or other types of dedicated processing devices for performing a desired process with respect to an acceleration signal output from a built-in acceleration detecting means before outputting a signal to the microcomputer 751. For example, the incorporation-type or dedicated processing device, when used for detection of a static acceleration (e.g., a gravity acceleration) by the acceleration sensor, may be for converting a sensed acceleration signal into a tilt angle corresponding thereto (or other preferable parameters).

The controller 7 functions as a wireless controller by means of the communication section 75 having the radio module 753 and the antenna 754. Note that the quartz oscillator 703 generates a basic clock for the microcomputer 751 (described below).

On the other hand, in FIG. 5B, the image capture information computing section 74 is provided at a front edge of a lower major surface of the base board 700. The image capture information computing section 74 is composed of an infrared filter 741, a lens 742, an image capturing element 743, and an image processing circuit 744, which are attached to the lower major surface of the base board 700 in this order from the front of the controller 7. The connector 73 is attached to a rear edge of the lower major surface of the base board 700. The operation button 72i is attached at the rear of the image capture information computing section 74 and on the lower major surface of the base board 700. Batteries 705 are housed at the rear of the operation button 72i. A vibrator 704 is attached on the lower major surface of the base board 700 and between the batteries 705 and the connector 73. The vibrator 704 may be, for example, a vibration motor or a solenoid. Vibration occurs in the controller 7 by an action of the vibrator 704, and is transferred to a player who is holding the controller 7, thereby achieving a so-called vibration feature-supporting game.

Next, an internal configuration of FIG. 6 will be described with reference to FIG. 6. Note that FIG. 6 is a block diagram illustrating the configuration of the controller 7.

The image capture information computing section 74 includes the infrared filter 741, the lens 742, the image capturing element 743, and the image processing circuit 744. The infrared filter 741 passes only infrared light entering from the front of the controller 7. The lens 742 collects infrared light passing through the infrared filter 741 and causes the light to enter the image capturing element 743. The image capturing element 743 may be, for example, a solid-state image capturing element, such as a CMOS sensor or a CCD, and captures infrared light collected by the lens 742. Therefore, the image capturing element 743 captures only infrared light passing through the infrared filter 741 to generate image data. The image data generated by the image capturing element 743 is processed by the image processing circuit 744. Specifically, the image processing circuit 744 processes the image data obtained from the image capturing element 743 to sense a high luminance portion, and outputs process result data indicating a result of detection of position coordinates or an area thereof to the communication section 75. Note that the image capture information computing section 74 is fixed to the housing 71 of the controller 7, so that an image capturing direction thereof can be changed by changing the orientation of the housing 71 itself.

As described above, the acceleration sensor 701 is a sensor which senses and outputs an acceleration with respect to each of the three components of the controller 7, i.e., the vertical direction (Y-axis direction), the lateral direction (X-axis direction), and the front-to-rear direction (Z-axis direction). Data indicating accelerations corresponding to the three axial components sensed by the acceleration sensor 701, is output to the communication section 75. Based on the acceleration data output from the acceleration sensor 701, a motion of the controller 7 can be determined. Note that the acceleration sensor 701 may be an acceleration sensor for detecting an acceleration with respect to each of any two of the three axes, depending on data required for a specific application.

The communication section 75 comprises the microcomputer 751, a memory 752, the radio module 753, and the antenna 754. The microcomputer 751 controls the radio module 753 for wirelessly transmitting transmission data while using the memory 752 as a memory area during a process.

An operation signal (key data) from the operation section 72 provided in the controller 7, acceleration signals in the three axial directions (X-, Y-and Z-axis direction acceleration data) from the acceleration sensor 701, and process result data from the image capture information computing section 74, are output to the microcomputer 751. The microcomputer 751 temporarily stores the received data (the key data, the X-, Y-and Z-axis direction acceleration data, and the process result data), as transmission data to be transmitted to the reception unit 6, into the memory 752. Here, radio transmission from the communication section 75 to the reception unit 6 is performed in predetermined cycles. Since a game is generally processed in units of 1/60 sec, the cycle of the radio transmission needs to be shorter than 1/60 sec. Specifically, the game processing unit is 16.7 ms (1/60 sec), and the transmission interval of the communication section 75 employing Bluetooth® is 5 ms. When timing of transmission to the reception unit 6 arrives, the microcomputer 751 outputs transmission data stored in the memory 752, as a series of pieces of operation information, to the radio module 753. Thereafter, the radio module 753 emits the operation information, as a radio signal, from the antenna 754 using a carrier wave by means of, for example, the Bluetooth® technique. Specifically, the key data from the operation section 72 provided in the controller 7, the X-, Y-and Z-axis direction acceleration data from the acceleration sensor 701, and the process result data from the image capture information computing section 74 are transmitted from the controller 7. Thereafter, the reception unit 6 of the game apparatus 3 receives the radio signal, and the game apparatus 3 demodulates or decodes the radio signal, thereby obtaining a series of pieces of operation information (the key data, the X-, Y-and Z-axis direction acceleration data, and the process result data). Thereafter, the CPU 30 of the game apparatus 3 performs a game process based on the obtained operation information and a game program. Note that, when the communication section 75 is configured using the Bluetooth® technique, the communication section 75 can also have a function of receiving transmission data wirelessly transmitted from other devices.

Figure 7:
FIG. 7 is a diagram illustrating an exemplary game screen of a game assumed in this embodiment.

Next, an outline of a game assumed in this embodiment will be described with reference to FIG. 7. The game assumed in this embodiment is a golf game. As illustrated in FIG. 7, a player object 101, who is ready to swing a golf club, is displayed on a game screen, as viewed from the rear. When a player performs a motion of swinging the controller 7, assuming it as a golf club, a motion of the player object 101 swinging the golf club is displayed in association with the player's motion.

Figure 8:
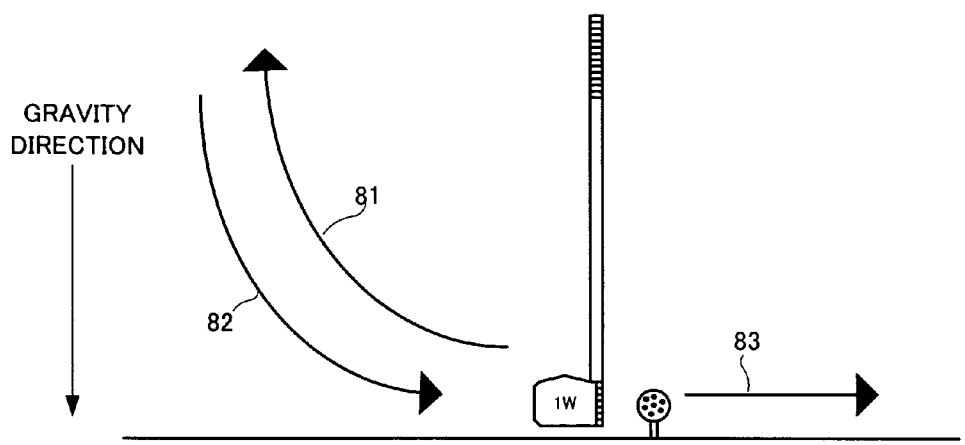
FIG. 8 is a diagram illustrating an image indicating swinging of a golf club.
Figure 9:
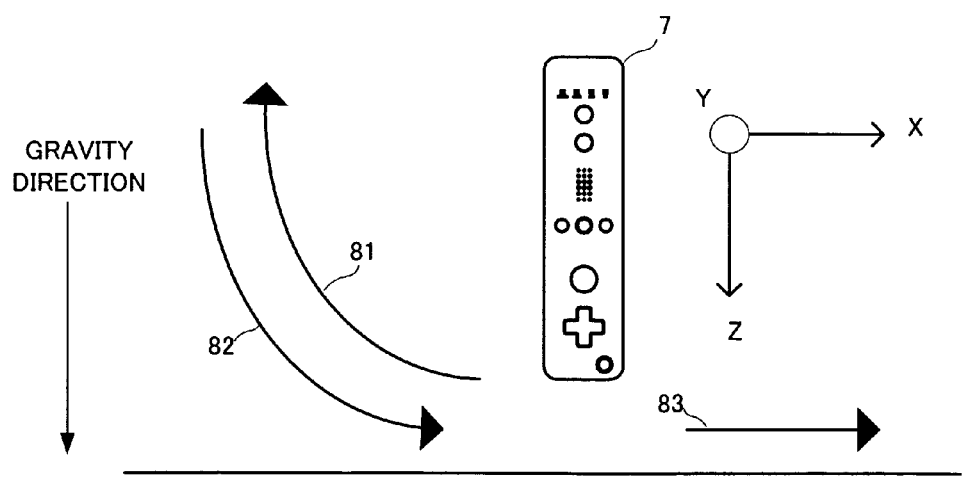
FIG. 9 is a diagram illustrating an image indicating swinging of the controller 7.

The swing operation will be described in more detail with reference to FIGS. 8 and 9. FIG. 8 is a diagram illustrating an image indicating swinging of a golf club. FIG. 9 is a diagram illustrating an image indicating swinging of the controller 7. The whole controller 7 has a size which allows an adult and a child to hold the controller 7 with one hand. To play the game using the controller 7 in the game system 1, a player holds the controller 7 with both hands while the front surface of the controller 7 faces downward (gravity direction). For example, a player exposes the front surface of the controller 7 downward, and holds the controller 7 as if the player held a golf club.

When a motion of swinging the golf club in an upper left direction 81 and then in a lower right direction 82 and then in a right direction 83 is performed using the controller 7 as illustrated in FIG. 8, an arm holding the controller 7 is swung up in an upper left direction 81 (upper right as viewed from the player), and then down in a lower right direction 82, and then in a right direction 83, where a state of the controller 7 facing downward is a reference, as illustrated in FIG. 9. Thereby, operation information (e.g., the X-, Y-and Z-axis direction acceleration data) is given from the controller 7 to the game apparatus 3. Thereafter, based on the operation information (acceleration data), a tilt and the like of the golf club are calculated, and based on the tilt and the like, the golf club is moved. As a result, it is displayed how the player object 101 swings the golf club.

In this case, for example, when the player's arm is swung at excessively high speed, the motion of the arm may not be accurately detected. Therefore, in this embodiment, for example, at the time when an acceleration becomes larger than or equal to a predetermined threshold value during a backswing motion, a motion of the golf club is drawn based on predetermined motion information instead of operation information from the controller 7. In other words, when the backswing speed is too high to accurately reflect the backswing motion on the game screen, a predetermined backswing motion is drawn irrespective of the motion of the player's arm (auto-animation process).

Figure 10:
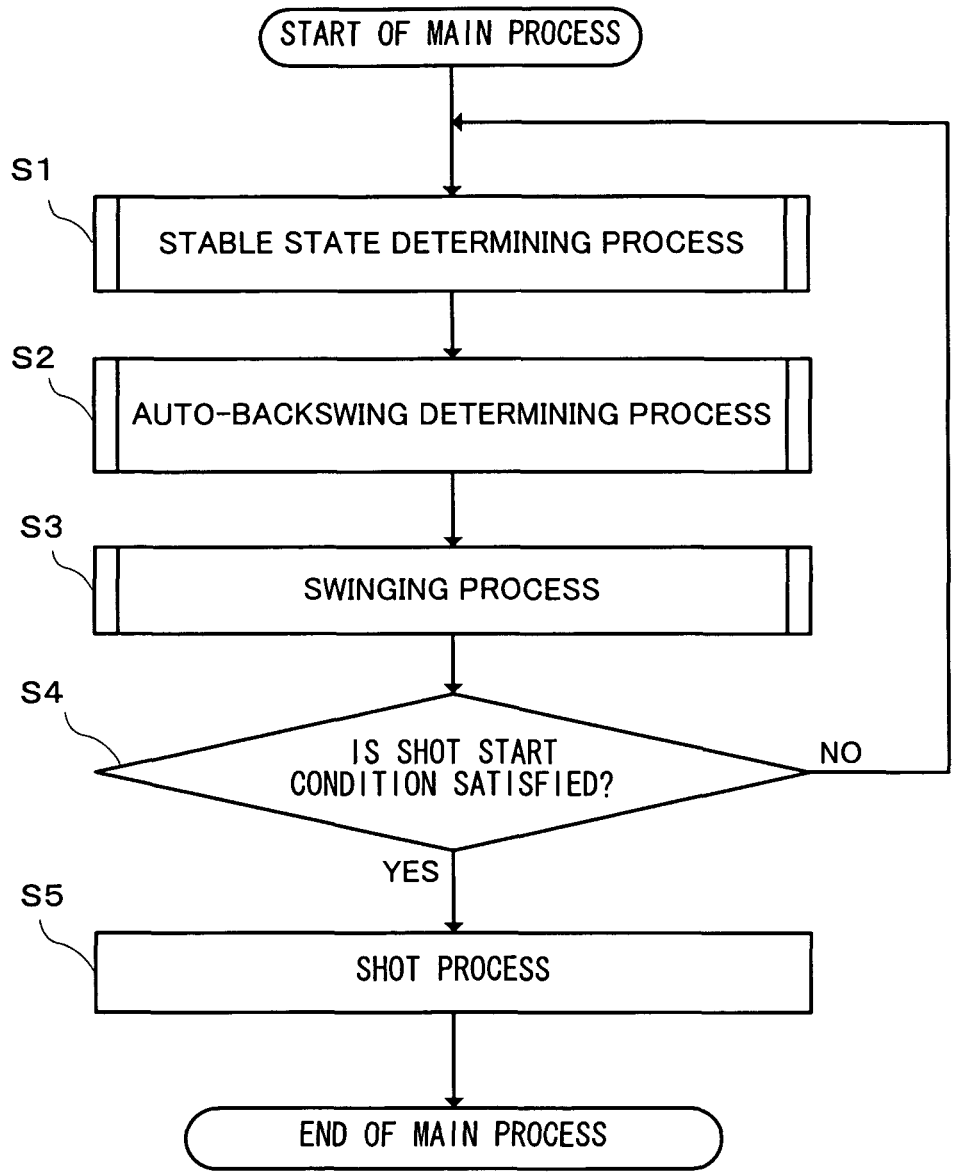
FIG. 10 is a flowchart of a flow of a game process executed in the game apparatus 3.
Figure 11:
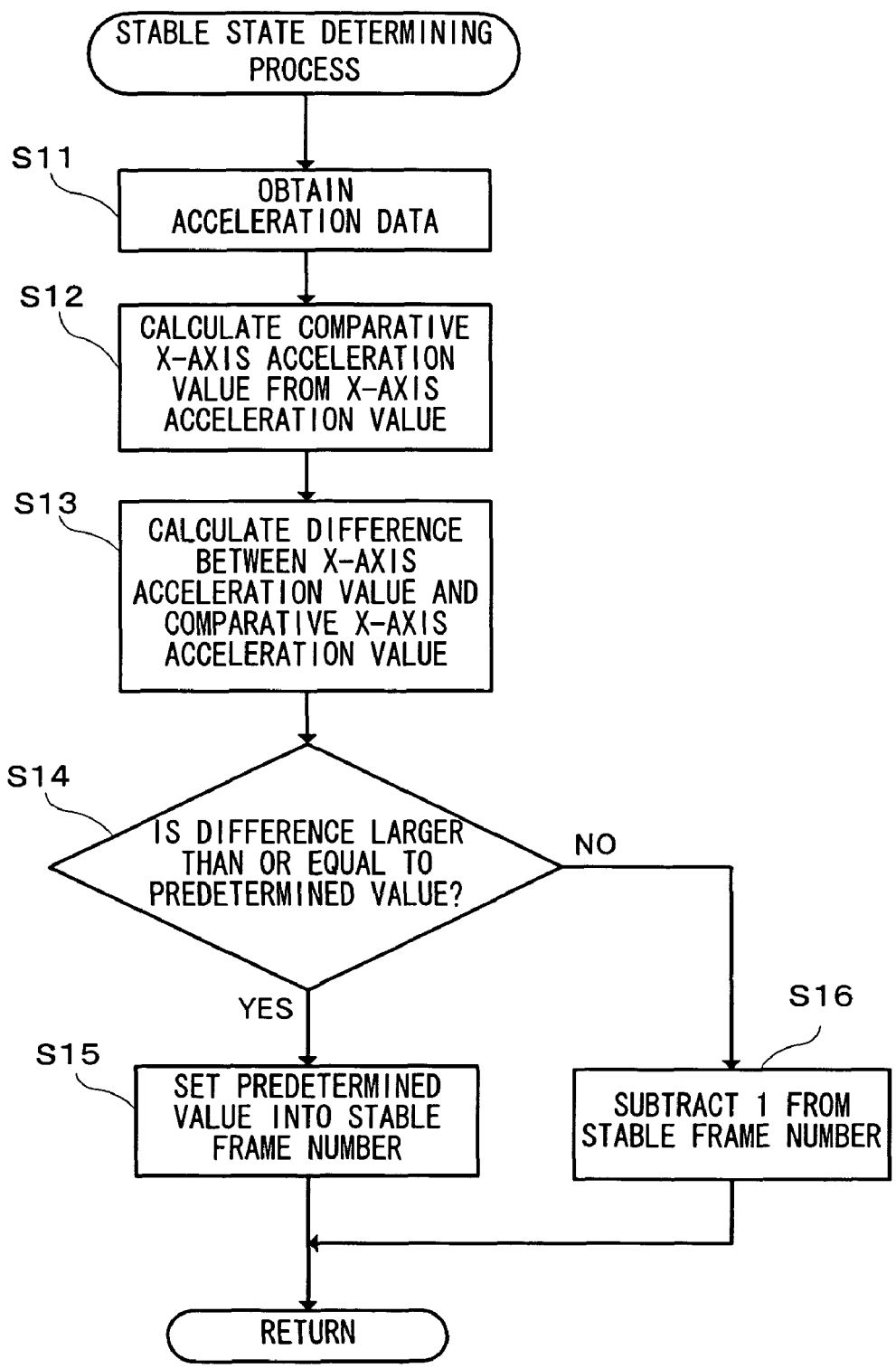
FIG. 11 is a flowchart illustrating a detail of a stable state determining process of step S1 of FIG. 10.

Next, a flow of the game process executed in the game apparatus 3 will be described with reference to FIGS. 10 to 13. FIG. 10 is a flowchart of the flow of the game process executed in the game apparatus 3. When the game apparatus 3 is powered ON, the CPU 30 of the game apparatus 3 executes a boot program stored in a boot ROM (not shown) to initialize each unit, such as a main memory 33 and the like. Thereafter, a game program stored on the optical disc 4 is read into the main memory 33, and execution of the game program is started. As a result, a game image is displayed via the GPU 12 on the monitor 2, so that a game is started. Thereafter, processes of flowcharts of FIGS. 10 and 11 are executed. Note that processes of steps S1 to S4 of FIG. 10 are repeatedly executed per frame. The game of this embodiment is a golf game as described above, and the process is related to swinging of a golf club. Other processes related to the golf game (selection of a course, calculation of a trajectory of a shot ball, etc.) are not directly related to the present invention, and will not be described.

In FIG. 10, initially, the CPU 30 performs a stable state determining process (step S1). The process is for removing a difference among individuals in a way to hold the controller 7 at the start of a swinging motion, and a swing start position of the controller 7. As the orientation of the controller 7 at the start of a swinging motion, the controller 7 ideally faces directly downward as illustrated in FIG. 9. However, there is a difference among individuals in a way to hold the controller 7 and a swing start position of the controller 7. Therefore, some players may hold the controller 7 while the front surface of the controller 7 does not face directly downward, and swing is started from a slightly rightward or leftward tilted state with respect to the X axis. In such a case, an acceleration corresponding to the slight tilt is already applied in the X-axis direction at the time of start of swinging. Therefore, such an acceleration applied in the X-axis direction at the swing start time is ignored, and a process of determining that a state in which an acceleration occurs while the controller 7 is stable (the controller 7 is slightly tilted) is in a stable state, but not in a swinging motion, is performed, thereby making it possible to remove a difference among individuals in a way to hold the controller 7 and a swing start position of the controller 7.

FIG. 11 is a flowchart illustrating a detail of the stable state determining process of step S1. In FIG. 11, initially, the CPU 30 obtains acceleration data from operation information transmitted from the controller 7 (step S11). Following this, the CPU 30 obtains an acceleration value in the X-axis direction (hereinafter referred to as an X-axis acceleration value) from the acceleration data. Further, from this value, a comparative acceleration value in the X-axis direction (hereinafter referred to as a comparative X-axis acceleration value) is calculated (step S12). The comparative X-axis acceleration value is calculated, for example, by:

the comparative X-axis acceleration value of a current frame=the comparative X-axis acceleration value of the previous frame+(the obtained X-axis acceleration value−the comparative X-axis acceleration value of the previous frame)×K where K represents a constant (e.g., 0.1).

Following this, the CPU 30 calculates a difference between the X-axis acceleration value and the comparative X-axis acceleration value of the current frame (step S13). Next, it is determined whether or not the difference is larger than or equal to a predetermined value (step S14). As a result, if the difference is larger than or equal to the predetermined value (YES in step S14), the predetermined value is set into a stable frame number which is a counter indicating a stable state (step S15). On the other hand, if the difference is smaller than the predetermined value (NO in step S14), 1 is subtracted from the stable frame number (step S16). In other words, if the difference between the X-axis acceleration value and the comparative X-axis acceleration value is larger than or equal to the predetermined value, it is determined that the controller 7 is in an unstable state (the controller 7 is being moved). If the difference is smaller than the predetermined value, it is determined that the controller 7 is in a stable state (the controller 7 is not being moved). Thus, the stable state determining process is completed.

Referring back to FIG. 10, next to the stable state determining process, the CPU 30 performs an auto-backswing determining process (step S2). Here, accelerations in the X-axis direction are accumulated, and depending on whether or not the accumulated value exceeds a predetermined threshold value, it is determined whether the golf club is to be moved based on the acceleration data from the controller 7 or predetermined data (auto-animation).

Figure 12:
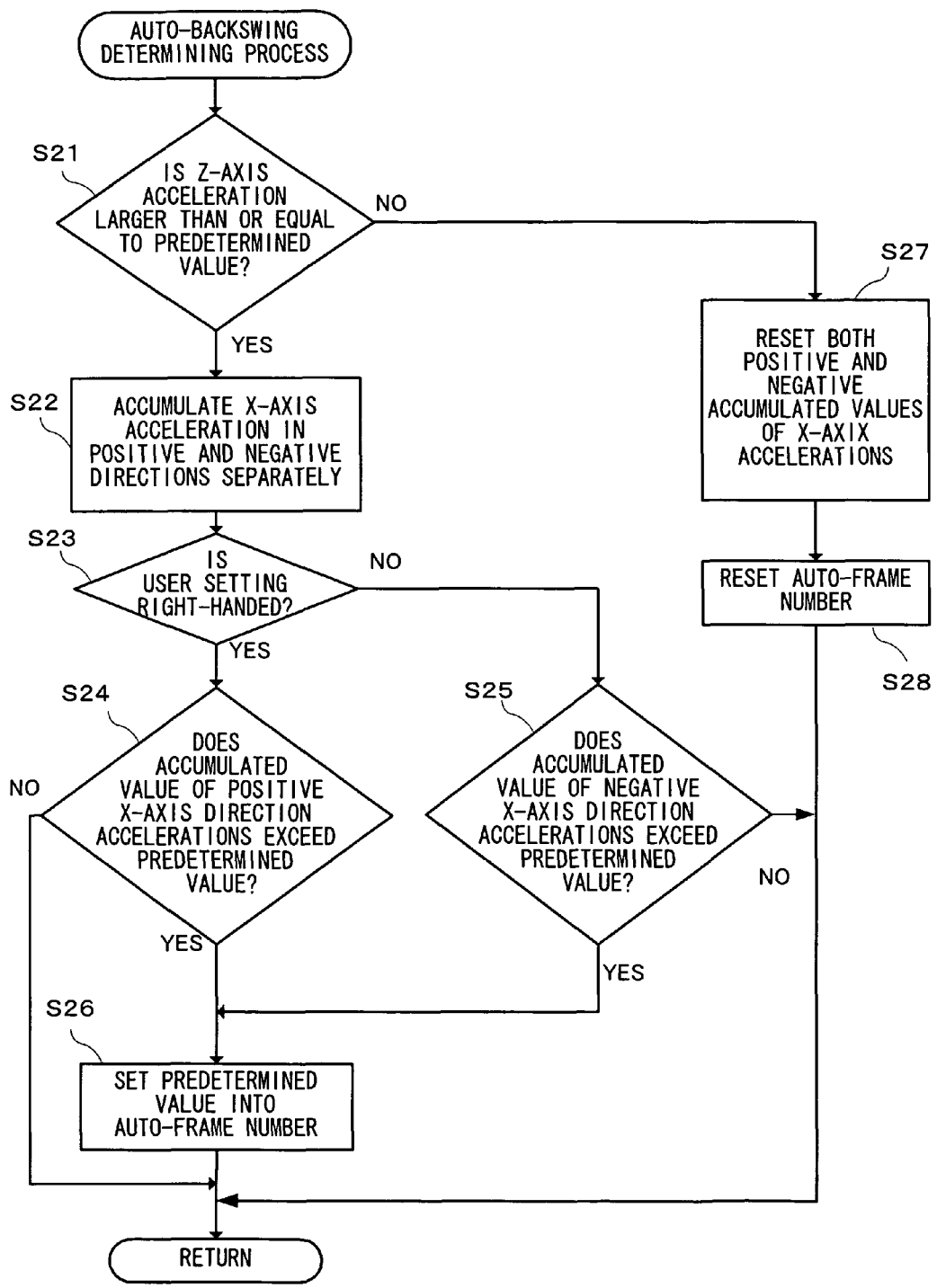
FIG. 12 is a flowchart illustrating a detail of an auto-backswing determining process of step S2 of FIG. 10.

FIG. 12 is a flowchart illustrating a detail of the auto-backswing determining process of step S2. In FIG. 12, initially, the CPU 30 determines whether or not the controller 7 is being swung (step S21). More specifically, when Z-axis direction acceleration data indicates a positive Z-axis direction value which exceeds a threshold value, the game apparatus 3 determines that the player is swinging the controller 7. For example, when the controller 7 is at rest, the acceleration sensor 701 does not detect an acceleration which exceeds the gravity acceleration 9.8 m/s$^2$. On the other hand, as described above, when the player swings an arm while holding the controller 7, a front edge portion of the controller 7 is moved, drawing an arc path, so that an acceleration in the positive Z-axis direction is detected due to an influence of centrifugal force (see FIG. 3). In this example, a value of 1.1 is set as a threshold value larger than or equal to the gravity acceleration, and when the Z-axis direction acceleration data indicates an acceleration which exceeds the threshold value, it is determined that the player is swinging the controller 7.

As a result of the determination in step S21, when the Z-axis direction acceleration data is larger than or equal to the predetermined value, i.e., it is determined that the controller 7 is being swung (YES in step S21), the X-axis direction acceleration data are next accumulated in the positive direction (the right direction in FIG. 9 since the controller 7 faces downward) and in the negative direction (the left direction in FIG. 9), separately (step S22). Here, it will be described how to determinate a direction in which the controller 7 is being swung. When the controller 7 is held and is being swung, the controller 7 is accelerated at the start of swinging and is decelerated at the end of swinging. Therefore, for the controller 7, after an acceleration occurs in the same direction as a direction in which the controller 7 is being started at the start of swinging, the magnitude of the acceleration gradually decreases, and an acceleration occurs in a direction reverse to a direction in which the controller 7 is being swung at the end of swinging. On the other hand, in general, an acceleration vector (or the sign (positive or negative) of an acceleration) output from the acceleration sensor 701 is a vector whose direction is exactly reverse to the acceleration direction of the controller 7. Therefore, after the acceleration sensor 701 detects an acceleration in a direction reverse to a direction in which the controller 7 is being swung at the start of swinging, the magnitude of the acceleration gradually decreases, and the acceleration sensor 701 detects an acceleration in the same direction as that in which the controller 7 is being swung at the end of swinging. For example, in FIG. 9, when the controller 7 is accelerated in the left direction of FIG. 9 while the front surface thereof is caused to face downward (i.e., the acceleration direction of the controller 7 is the negative X-axis direction), a positive X-axis direction vector is obtained as an acceleration vector obtained from the acceleration sensor 701. Therefore, if positive-direction acceleration data is accumulated, acceleration data of a motion of swinging up in the left direction can be accumulated. Also, if negative-direction acceleration data is accumulated, acceleration data of a motion of swinging up in the right direction can be accumulated.

Next, it is determined whether the player is right-handed or left-handed (which arm is a dominant arm) (step S23). This determination is achieved by referencing a user's set value (stored in the main memory 33) which is previously set by the player on an option screen or the like. It is here assumed that the user's set value is either "right-handed" or "left-handed". When it is determined that the player is right-handed (YES in step S23), it is determined whether or not the positive-direction accumulated acceleration exceeds a predetermined value (step S24). As a result, when the positive-direction accumulated acceleration is larger than or equal to the predetermined value (YES in step S24), a predetermined value is set into an auto-frame number (step S25). The auto-frame number refers to a counter for indicating time at which auto-animation is performed. When the positive-direction accumulated acceleration is not larger than or equal to the predetermined value (NO in step S24), the auto-backswing determining process is ended without setting the auto-frame number.

On the other hand, when the player is left-handed (NO in step S23), it is determined whether or not the negative-direction accumulated acceleration exceeds a predetermined value (step S25). As a result, when the negative-direction accumulated acceleration is larger than or equal to the predetermined value, a predetermined value is set into the auto-frame number (step S26). On the other hand, when the negative-direction accumulated acceleration is not larger than or equal to the predetermined value (NO in step S25), the auto-backswing determining process is ended without setting the auto-frame number.

On the other hand, as a result of the determination in step S21, when the Z-axis direction acceleration data is smaller than or equal to the predetermined value, i.e., the controller 7 is not being swung, the accumulated value is set to be 0 (step S27). Further, the auto-frame number is set to be 0 (step S28). Thereby, the auto-animation process in a swinging process described below can be canceled partway through. Thus, the auto-backswing determining process is completed.

Figure 13:
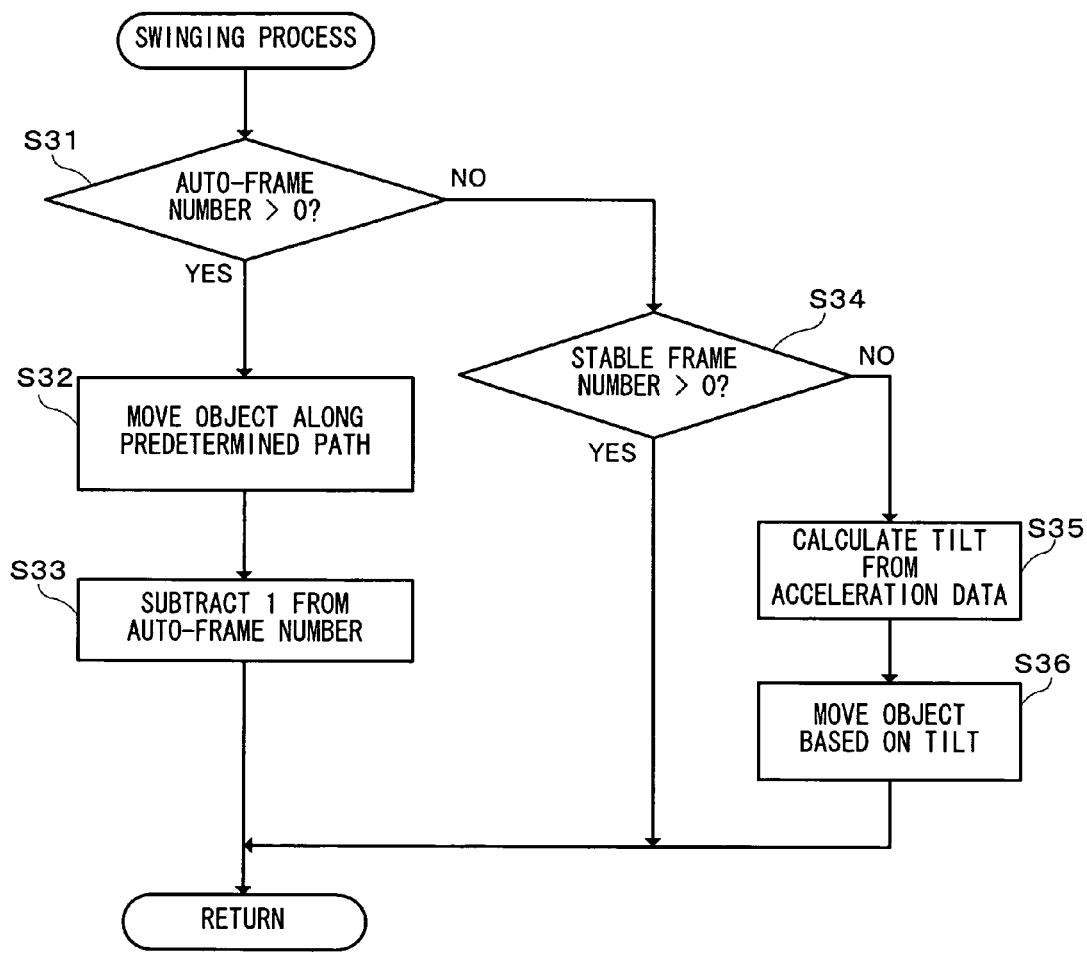
FIG. 13 is a flowchart of a detail of a swinging process of step S3 of FIG. 10.

Referring back to FIG. 10, if the auto-backswing determining process of step S2 is finished, the swinging process is next performed (step S3). FIG. 13 is a flowchart of a detail of the swinging process of step S3. Here, based on the process result of the auto-backswing determining process, a process of drawing a swinging motion of the player object 101 is performed. In FIG. 13, initially, the CPU 30 determines whether or not the auto-frame number is larger than 0 (step S31). In other words, it is determined whether or not the auto-animation process is to be performed. As a result of the determination, when the auto-frame number is larger than 0 (YES in step S31), a backswinging motion of the player object 101 is drawn so that the golf club is moved in accordance with predetermined movement data (movement path and movement velocity) of the golf club (step S32). Specifically, when the X-axis direction acceleration exceeds a threshold value, a motion of backswinging the golf club is drawn as auto-animation irrespective of a subsequent actual motion of the player's arm. Thereafter, 1 is subtracted from the auto-frame number (step S33) before the swinging process is ended.

On the other hand, when it is determined in step S31 that the auto-frame number is 0 (NO in step S31), it is determined whether or not the stable frame number is larger than 0 (step S34). As a result, when it is determined that the stable frame number is larger than 0 (YES in step S34), it is considered that the controller 7 is being swung at some speed, though the auto-animation process is not performed. For example, when the dominant arm is the right arm, backswing is not performed in the right direction, and the arm is swung in the opposite direction (left direction). In this case, the process is ended without a further process. As a result, it is drawn that the player object 101 is ready to perform a swinging motion, holding the golf club.

On the other hand, when the stable frame number is 0 (NO in step S34), a tilt of the controller 7 is calculated based on the acceleration data (step S35). Following this, coordinate points through which the golf club is moved are determined based on the tilt. Thereafter, it is drawn how the golf club is moved through the coordinate points (step S36). In other words, the golf club in the screen is moved in accordance with an actual input motion of the player. As a result, a motion of the player object 101 swinging the golf club is drawn in association with a motion of the player's arm. Thus, the swinging process is completed.

Referring back to FIG. 10, when the swinging process is finished, the CPU 30 determines whether or not a shot start condition is satisfied (step S4). For example, X-axis direction acceleration data of the controller 7 is accumulated in the positive direction and in the negative direction, and conversely with respect to the determination of steps S23 to S25, when the player is right-handed, it is determined whether or not the positive-direction accumulated acceleration exceeds a predetermined value, and when the player is left-handed, it is determined whether or not the negative-direction accumulated acceleration exceeds a predetermined value. When the predetermined value is exceeded, it is determined that the shot start condition is satisfied. When the shot start condition is satisfied (YES in step S4), the CPU 30 performs a shot process (step S5). In this process, a process of causing a ball to fly is performed by calculating of a trajectory and the like of the ball. On the other hand, when the shot start condition is not satisfied (NO in step S4), the process returns to step S1 and is repeated. Thus, the game process of this embodiment is completed.

As described above, in the example embodiment of the present invention, it is determined whether or not an acceleration of an input device swung by a player is larger than or equal to a threshold value. As a result, when a large acceleration exceeding the threshold value is applied, a predetermined series of motions are drawn. Thereby, when an acceleration is excessively large, so that a motion of a player's arm cannot be accurately reflected, a previously prepared animation of a motion which would be performed by a player (or is considered to be desired by the player) is displayed. When the acceleration is not larger than or equal to the threshold value, a motion on which a motion of a player's arm is reflected is displayed. Thereby, it is possible to prevent a motion which is not intended by a player from being displayed due to an excessively high speed of a player's arm, or the like.

Although the determination is performed using accumulation of X-axis direction accelerations in the above-described embodiment, the present invention is not limited to this. The determination may be performed only based on a current acceleration, i.e., without accumulation. Also in such a case, it is possible to prevent a motion which is not intended by a player from being displayed due to an excessively high speed of a player's arm, or the like.

Also, in the process of step S21 of FIG. 12, X-axis direction acceleration values may be accumulated in the positive direction and in the negative direction separately when a state where a Z-axis acceleration is larger than or equal to a predetermined value, continues for a predetermined time or more. Thereby, it is possible to reduce unrealistic sensation which a player feels due to a sensitive reaction.

Also, an input may not be received until a series of motions are ended after the start of auto-animation. For example, the auto-backswing determining process of step S2 of FIG. 10 may not be performed until the auto-frame number becomes 0 after the start of auto-animation of step S32 of FIG. 13. Thereby, it is possible to prevent a motion which is not intended by a player from being displayed due to an erroneous operation or the like after auto-animation is once started. Further, a reproduction speed of auto-animation (a swing speed of a golf club) may be changed, depending on the value of an acceleration at the start of the auto-animation.

While the example embodiments of the invention have been described in detail, the foregoing description is in all aspects illustrative and not restrictive. It is understood that numerous other modifications and variations can be devised without departing from the scope of the invention.

What is claimed is:

1. A game apparatus for performing a game process, depending on a motion of an input device itself, comprising:
an output data obtaining programmed logic circuitry for obtaining first output data and second output data which change, depending on the motion of the input device itself;
a movement coordinate determining programmed logic circuitry for determining whether or not the first output data is larger than or equal to a first threshold value, and when the first output data is larger than or equal to the first threshold value, determining a coordinate point to which an object is next moved in a predetermined change amount along a predetermined path in a virtual game space, and when the first output data is smaller than the first threshold value, determining a coordinate point to which the object is next moved along the predetermined path in the virtual game space, using the first output data and the second output data;
an object moving programmed logic circuitry for moving the object to the determined movement coordinate point in the virtual game space; and
a display control programmed logic circuitry for displaying the virtual game space on a display device, depending on a result of the object moving programmed logic circuitry.

2. The game apparatus according to claim 1, wherein, when the first output data is smaller than the first threshold value, the movement coordinate determining programmed logic circuitry determines a coordinate point to which the object is moved in a direction along the predetermined path in the virtual game space corresponding to a direction in which the input device itself is moved based on the second output data.

3. The game apparatus according to claim 1, further comprising:
a tilt calculating programmed logic circuitry for calculating a tilt of the input device itself using the first output data and the second output data,
wherein, when the first output data is smaller than the first threshold value, the movement coordinate determining programmed logic circuitry determines a coordinate point to which the object is moved in a direction along the predetermined path in the virtual game space based on the tilt calculated by the tilt calculating programmed logic circuitry.

4. The game apparatus according to claim 1, wherein, in the case where the first output data is larger than or equal to the first threshold value, when the second output data is larger than or equal to a second threshold value, the movement coordinate determining programmed logic circuitry determines a coordinate point to which the object is next moved in the predetermined change amount along the predetermined path in the virtual game space, and when the second output data is smaller than the second threshold value, the movement coordinate determining programmed logic circuitry determines a coordinate point to which the object is next moved along predetermined path in the virtual game space using the first output data and the second output data.

5. The game apparatus according to claim 1, further comprising:
an output data accumulating programmed logic circuitry for accumulating a value of the second output data per unit time,
wherein the movement coordinate determining programmed logic circuitry determines per the unit time whether or not the accumulated value of the second output data is larger than or equal to a second threshold value, and when the accumulated value of the second output data is larger than or equal to the second threshold value, determines a coordinate point to which the object is next moved in the predetermined change amount along the predetermined path in the virtual game space, and when the accumulated value of the second output data is smaller than the second threshold value, the movement coordinate determining programmed logic circuitry determines a coordinate point to which the object is next moved along predetermined path in the virtual game space using the first output data and the second output data.

6. The game apparatus according to claim 5, wherein the output data accumulating programmed logic circuitry starts accumulating the value of the second output data only when a value of the first output data continues to be larger than or equal to the first threshold value for a predetermined time or more.

7. The game apparatus according to claim 6, further comprising:
an accumulated value initializing programmed logic circuitry for initializing the accumulated value of the second output data when the first output data becomes smaller than or equal to the first threshold value after the output data accumulating programmed logic circuitry starts accumulating the value of the second output data.

8. The game apparatus according to claim 5, further comprising:
a dominant arm information storing programmed logic circuitry for setting and storing dominant arm information which is information about a player's dominant arm, into a memory,
wherein the output data accumulating programmed logic circuitry starts accumulating the value of the second output data separately in directions of the input device itself, depending on the dominant arm information.

9. The game apparatus according to claim 1, wherein the movement coordinate determining programmed logic circuitry determines a coordinate point to which the object is next moved along predetermined path in the virtual game space no matter whether or not the first output data is larger or equal to the first threshold value, until a predetermined time passes after the coordinate point to which the object is next moved along predetermined path in the virtual game space is determined.

10. The game apparatus according to claim 1, wherein the input device comprises an acceleration sensor for detecting an acceleration occurring in the input device, and
the first output data and the second output data are acceleration data which is output from the acceleration sensor, depending on the motion of the input device itself.

11. The game apparatus according to claim 1, wherein the game process is a process of executing a game in which a player character swings an item possessed by the player character to hit a ball to cause the ball to fly in a virtual game world,
the object is an item object possessed by the player character, and
the predetermined path is a path for displaying a series of motions of the player character swinging the item.

12. A non-transitory computer-readable recording medium recording a game program which is executed by a computer of a game apparatus for performing a game process, depending on a motion of an input device itself, the game program causing the computer to execute:

an output data obtaining step of obtaining first output data and second output data which change, depending on the motion of the input device itself;

a movement coordinate determining step of determining whether or not the first output data is larger than or equal to a first threshold value, and when the first output data is larger than or equal to the first threshold value, determining a coordinate point to which an object is next moved in a predetermined change amount along a predetermined path in a virtual game space, and when the first output data is smaller than the first threshold value, determining a coordinate point to which the object is next moved along the predetermined path in the virtual game space, using the first output data and the second output data;

an object moving step of moving the object to the determined movement coordinate point in the virtual game space; and a display control step of displaying the virtual game space on a display device, depending on a result of the object moving step.

13. The non-transitory computer-readable recording medium according to claim 12, wherein, when the first output data is smaller than the first threshold value, the movement coordinate determining step determines a coordinate point to which the object is moved in a direction along the predetermined path in the virtual game space corresponding to a direction in which the input device itself is moved based on the second output data.

14. The non-transitory computer-readable recording medium according to claim 12, wherein the game program causes the computer to further execute:

a tilt calculating step of calculating a tilt of the input device itself using the first output data and the second output data, wherein, when the first output data is smaller than the first threshold value, the movement coordinate determining step determines a coordinate point to which the object is moved in a direction along the predetermined path in the virtual game space based on the tilt calculated by the tilt calculating step.

15. The non-transitory computer-readable recording medium according to claim 12, wherein, in the case where the first output data is larger than or equal to the first threshold value, when the second output data is larger than or equal to a second threshold value, the movement coordinate determining step determines a coordinate point to which the object is next moved in the predetermined change amount along the predetermined path in the virtual game space, and when the second output data is smaller than the second threshold value, the movement coordinate determining step determines a coordinate point to which the object is next moved along predetermined path in the virtual game space using the first output data and the second output data.

16. The non-transitory computer-readable recording medium according to claim 12, wherein the game program causes the computer to further execute:

an output data accumulating step of accumulating a value of the second output data per unit time, wherein the movement coordinate determining step determines per the unit time whether or not the accumulated value of the second output data is larger than or equal to a second threshold value, and when the accumulated value of the second output data is larger than or equal to the second threshold value, determines a coordinate point to which the object is next moved in the predetermined change amount along the predetermined path in the virtual game space, and when the accumulated value of the second output data is smaller than the second threshold value, the movement coordinate determining step determines a coordinate point to which the object is next moved along predetermined path in the virtual game space using the first output data and the second output data.

17. The non-transitory computer-readable recording medium according to claim 16, wherein the output data accumulating step starts accumulating the value of the second output data only when a value of the first output data continues to be larger than or equal to the first threshold value for a predetermined time or more.

18. The non-transitory computer-readable recording medium according to claim 17, wherein the game program causes the computer to further execute:

an accumulated value initializing step of initializing the accumulated value of the second output data when the first output data becomes smaller than or equal to the first threshold value after the output data accumulating step starts accumulating the value of the second output data.

19. The non-transitory computer-readable recording medium according to claim 16, wherein the game program causes the computer to further execute:

a dominant arm information storing step of setting and storing dominant arm information which is information about a player's dominant arm, into a memory, wherein the output data accumulating step starts accumulating the value of the second output data separately in directions of the input device itself, depending on the dominant arm information.

20. The non-transitory computer-readable recording medium according to claim 12, wherein the movement coordinate determining step determines a coordinate point to which the object is next moved along predetermined path in the virtual game space no matter whether or not the first output data is larger or equal to the first threshold value, until a predetermined time passes after the coordinate point to which the object is next moved along predetermined path in the virtual game space is determined.

21. The non-transitory computer-readable recording medium according to claim 12, wherein the input device comprises an acceleration sensor for detecting an acceleration occurring in the input device, and the first output data and the second output data are acceleration data which is output from the acceleration sensor, depending on the motion of the input device itself 22. The non-transitory computer-readable recording medium according to claim 12, wherein the game process is a process of executing a game in which a player character swings an item possessed by the player character to hit a ball to cause the ball to fly in a virtual game world, the object is an item object possessed by the player character, and the predetermined path is a path for displaying a series of motions of the player character swinging the item.

23. A computer-implemented method for performing a game process, depending on a motion of an input device itself, the method comprising:

obtaining first output data and second output data which change, depending on the motion of the input device itself;

determining whether or not the first output data is larger than or equal to a first threshold value, and when the first output data is larger than or equal to the first threshold value, determining a coordinate point to which an object is next moved in a predetermined change amount along a predetermined path in a virtual game space, and when the first output data is smaller than the first threshold value, determining a coordinate point to which the object is next moved along the predetermined path in the virtual game space, using the first output data and the second output data;

moving the object to the determined movement coordinate point in the virtual game space; and generating a display of the virtual game space, depending on a result of moving the object.

24. The computer-implemented method according to claim 23, wherein, when the first output data is smaller than the first threshold value, a coordinate point is determined to which the object is moved in a direction along the predetermined path in the virtual game space corresponding to a direction in which the input device itself is moved based on the second output data.

25. The computer-implemented method according to claim 23, further comprising:

calculating a tilt of the input device itself using the first output data and the second output data, wherein, when the first output data is smaller than the first threshold value, a coordinate point is determined to which the object is moved in a direction along the predetermined path in the virtual game space based on the calculated tilt.

26. The computer-implemented method according to claim 23, wherein, in the case where the first output data is larger than or equal to the first threshold value, when the second output data is larger than or equal to a second threshold value, a coordinate point is determined to which the object is next moved in the predetermined change amount along the predetermined path in the virtual game space, and when the second output data is smaller than the second threshold value, a coordinate point is determined to which the object is next moved along predetermined path in the virtual game space using the first output data and the second output data.

27. The computer-implemented method according to claim 23, further comprising:

accumulating a value of the second output data per unit time, determining per the unit time whether or not the accumulated value of the second output data is larger than or equal to a second threshold value, and when the accumulated value of the second output data is larger than or equal to the second threshold value, a coordinate point is determined to which the object is next moved in the predetermined change amount along the predetermined path in the virtual game space, and when the accumulated value of the second output data is smaller than the second threshold value, a coordinate point is determine to which the object is next moved along predetermined path in the virtual game space using the first output data and the second output data.

28. The computer-implemented method according to claim 27, wherein said accumulating includes starting accumulating the value of the second output data only when a value of the first output data continues to be larger than or equal to the first threshold value for a predetermined time or more.

29. The computer-implemented method according to claim 28, further comprising:

initializing the accumulated value of the second output data when the first output data becomes smaller than or equal to the first threshold value after said accumulating starts accumulating the value of the second output data.

30. The computer-implemented method according to claim 27, further comprising:

setting and storing dominant arm information which is information about a player's dominant arm, into a memory, wherein said accumulating includes starting accumulating the value of the second output data separately in directions of the input device itself, depending on the dominant arm information.

31. The computer-implemented method according to claim 23, wherein a coordinate point is determined to which the object is next moved along predetermined path in the virtual game space no matter whether or not the first output data is larger or equal to the first threshold value, until a predetermined time passes after the coordinate point to which the object is next moved along predetermined path in the virtual game space is determined.

32. The computer-implemented method according to claim 23, wherein the input device comprises an acceleration sensor for detecting an acceleration occurring in the input device, and the first output data and the second output data are acceleration data which is output from the acceleration sensor, depending on the motion of the input device itself 33. The computer-implemented method according to claim 23, wherein the game process is a process of executing a game in which a player character swings an item possessed by the player character to hit a ball to cause the ball to fly in a virtual game world, the object is an item object possessed by the player character, and the predetermined path is a path for displaying a series of motions of the player character swinging the item.

34. An apparatus for performing a process, depending on a motion of an input device itself, the apparatus comprising:

an output data obtaining programmed logic circuitry for obtaining first output data and second output data which change, depending on the motion of the input device itself;

a movement coordinate determining programmed logic circuitry for determining whether or not the first output data is larger than or equal to a first threshold value, and when the first output data is larger than or equal to the first threshold value, determining a coordinate point to which an object is next moved in a predetermined change amount along a predetermined path in a virtual space, and when the first output data is smaller than the first threshold value, determining a coordinate point to which the object is next moved along the predetermined path in the virtual space, using the first output data and the second output data;

an object moving programmed logic circuitry for moving the object to the determined movement coordinate point in the virtual space; and a display control programmed logic circuitry for displaying the virtual space on a display device, depending on a result of the object moving programmed logic circuitry.

35. A non-transitory computer-readable recording medium recording a program which is executed by a computer of an apparatus for performing a process, depending on a motion of an input device itself, the program causing the computer to execute:

an output data obtaining step of obtaining first output data and second output data which change, depending on the motion of the input device itself;

a movement coordinate determining step of determining whether or not the first output data is larger than or equal to a first threshold value, and when the first output data is larger than or equal to the first threshold value, determining a coordinate point to which an object is next moved in a predetermined change amount along a predetermined path in a virtual space, and when the first output data is smaller than the first threshold value, determining a coordinate point to which the object is next moved along the predetermined path in the virtual space, using the first output data and the second output data;

an object moving step of moving the object to the determined movement coordinate point in the virtual space; and a display control step of displaying the virtual space on a display device, depending on a result of the object moving step.

36. A computer-implemented method for performing a process, depending on a motion of an input device itself, the method comprising:

obtaining first output data and second output data which change, depending on the motion of the input device itself;

determining whether or not the first output data is larger than or equal to a first threshold value, and when the first output data is larger than or equal to the first threshold value, determining a coordinate point to which an object is next moved in a predetermined change amount along a predetermined path in a virtual space, and when the first output data is smaller than the first threshold value, determining a coordinate point to which the object is next moved along the predetermined path in the virtual space, using the first output data and the second output data;

moving the object to the determined movement coordinate point in the virtual space; and generating a display of the virtual space, depending on a result of moving the object.

* * * * *